United States Patent [19]
Saito

[11] Patent Number: 5,162,924
[45] Date of Patent: Nov. 10, 1992

[54] FACSIMILE APPARATUS HAVING DATA LIBRARY FUNCTION

[75] Inventor: Yuichi Saito, Hadano, Japan

[73] Assignee: Ricoh Company, Ltd., Tokyo, Japan

[21] Appl. No.: 707,755

[22] Filed: May 30, 1991

[30] Foreign Application Priority Data

Jun. 4, 1990 [JP] Japan ................... 2-144541

[51] Int. Cl.[5] .......................................... H04M 11/00
[52] U.S. Cl. .................................................... 358/440
[58] Field of Search ................. 358/440, 402, 407; 379/100

[56] References Cited

U.S. PATENT DOCUMENTS

| | | | |
|---|---|---|---|
| 4,317,136 | 2/1982 | Keyt et al. ................... | 358/440 |
| 4,532,379 | 7/1985 | Tsukioka ..................... | 358/440 |
| 5,077,787 | 12/1991 | Matsumoto .................. | 358/440 |

Primary Examiner—Stephen Brinich
Attorney, Agent, or Firm—Oblon, Spivak, McClelland, Maier & Neustadt

[57] ABSTRACT

A facsimile apparatus having a data library function. The facsimile apparatus includes a reading part for reading a document to generate an image data from the document, a library memory for storing the image data from the reading part, a calling control part for enabling the image data to be stored in the library memory and for calling out the image data from the library memory, an input part for inputting a telephone number of a receiving facsimile, and a transmitting part for transmitting the image data to a receiving facsimile, the image data being called out by the calling control part from the library memory when a specified button is depressed, and the receiving facsimile being designated by the telephone number inputted from the input part. With the facsimile apparatus of the present invention, the user can freely store any form and contents of one or more sending data in the library memory by reading a document containing the sending data and depressing a specified button so that the stored data in the library memory is transmitted to the receiving facsimile with the inputted telephone number.

10 Claims, 5 Drawing Sheets

FACSIMILE APPARATUS HAVING DATA LIBRARY FUNCTION

BACKGROUND OF THE INVENTION

The present invention relates to a facsimile apparatus having a data library function for transmitting image data stored in a library memory to a receiving facsimile with a designated telephone number.

There are several types of prior art facsimile apparatus which can transmit information already stored in a library memory to another facsimile. Among such prior facsimile apparatus, one type can transmit to a receiving facsimile a pattern of transmission data (characters or marks) selected by a user from among a number of fixed data patterns which are already stored in a library memory in the facsimile product manufactured. Another type of facsimile apparatus can automatically transmit a fixed pattern of transmission data to a receiving facsimile when an urgent matter like a disaster takes place, the fixed pattern being prepared for emergency purpose and already stored in a library memory together with a telephone number of the receiving facsimile. Still another type is a facsimile apparatus which can transmit a fixed data pattern to a receiving facsimile when a specific pushbutton key is depressed. However, the prior facsimile apparatus can only transmit a fixed data pattern which has already been stored by the manufacturer in a memory part, and there is a problem in that the prior facsimile apparatus offers no opportunity for the user to input a pattern of transmission data in the memory part. Thus, the uses of the prior facsimile apparatus are limited, and there is an increasing demand for a facsimile apparatus having a wider application.

SUMMARY OF THE INVENTION

Accordingly, it is a general object of the present invention to provide an improved facsimile apparatus in which the above described problems of the prior facsimile apparatus are eliminated.

Another and more specific object of the present invention is to provide a facsimile apparatus having a data library function which allows the user to freely store an arbitrary form of transmission data in a library memory so that the stored data is transmitted to a receiving facsimile. The above mentioned object of the present invention is achieved by a facsimile apparatus which comprises a document reading part for reading a document to generate an image data from the document, a library memory part for storing the image data from the document, a calling control part for enabling the image data from the document to be stored in the library memory part and for calling out the image data from the library memory part, an input part for designating a telephone number of a receiving facsimile, and a transmitting part for transmitting the image data to the receiving facsimile, the image data being called out by the calling control part from the memory part, and the receiving facsimile having the telephone number designated by the input part. According to the facsimile apparatus of the present invention, it is possible for the user to store a unique pattern of transmission data in the library memory part of the facsimile apparatus. The document reading part of the facsimile apparatus reads a document containing the unique pattern of transmission data, which is freely made up by the user, to generate image signals representing the unique pattern, and the central processor enables the same to be stored in the library memory part. By depressing a button of the calling control part to call out the stored pattern of transmission data from the library memory part and by inputting a telephone number of a receiving facsimile from the input part, the user can easily transmit his unique pattern of transmission data to the designated receiving facsimile.

Other objects and further features of the present invention will become more apparent from the following detailed description when read in conjunction with the accompanying drawings.

DESCRIPTION OF THE PREFERRED EMBODIMENTS

Figure 2:
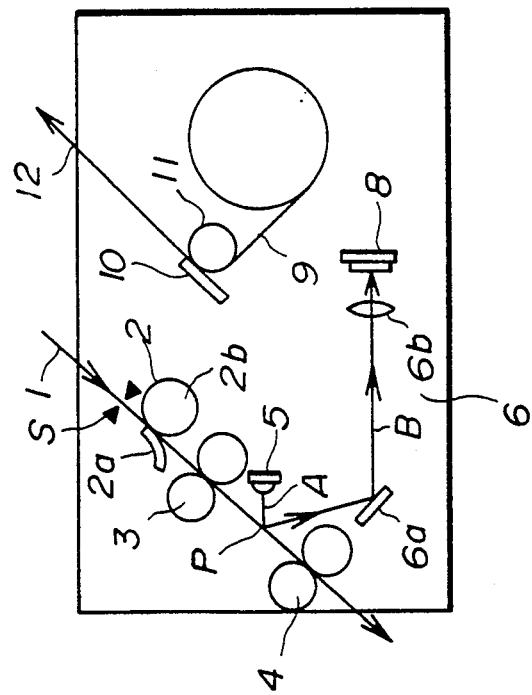
FIG. 2 is a cross-sectional view schematically showing an embodiment of a facsimile apparatus according to the present invention.

First, a description will be given of an embodiment of a facsimile apparatus according to the present invention, with reference to FIG. 2. The facsimile apparatus shown in FIG. 2 generally has a transport path 1, a document detection sensor S, a separation part 2 including a separating pad 2a and a paper feeding roller 2b, a pair of first feeding rollers 3, a pair of second feeding rollers 4, a light source 5 for emitting a light A which is irradiated to a reading position P where a document is transported along the transport path 1 between the first and second feeding rollers 3 and 4, an optical system 6 including a reflection mirror 6a and an imaging lens 6b, a document reading part 8 made up of several photoelectric conversion elements (which are, for example, CCDs), a recording paper 9 being supplied from a roll of heat-sensitive sheets, a thermal head 10, a platen roller 11, and a paper transport path 12. In FIG. 2, a document (not shown) is set at a given location of the facsimile apparatus, and is transported to the separation part 2 along the transport path 1. Paper separation is made by the separating pad 2a and the paper feeding roller 2b of the separation part 2 so that documents are separated from each other, and each document is transported one by one along the document transport path 1 to the reading position P between the first feeding rollers 3 and the second feeding rollers 4. The document at the reading position P is exposed by the light A emitted from the light source 5 and the light A scans the document along a scanning line. A reflected light beam B reflected from the reading position P of the document is further reflected by the reflection mirror 6a and is focused by the imaging lens 6b so that an optical image is formed on the document reading part 8 where photoelectric conversion elements are provided to generate electric image signals from the focused light. A reading of image information from the document is thus carried out by the facsimile apparatus. After the reading of image information from the document is completed, then the document is ejected by the second feeding rollers 4 from the document transport path 1 to a prescribed location outside the facsimile apparatus.

In the meantime, when a transmission data is received from an external facsimile, the facsimile apparatus carries out a printing of the received transmission data onto a recording paper 9 between the thermal head 10 and the platen roller 11. Then, the recording paper 9 is fed out by the platen roller 11 from the paper transport path 12 to a prescribed location outside the facsimile apparatus.

Figure 1:
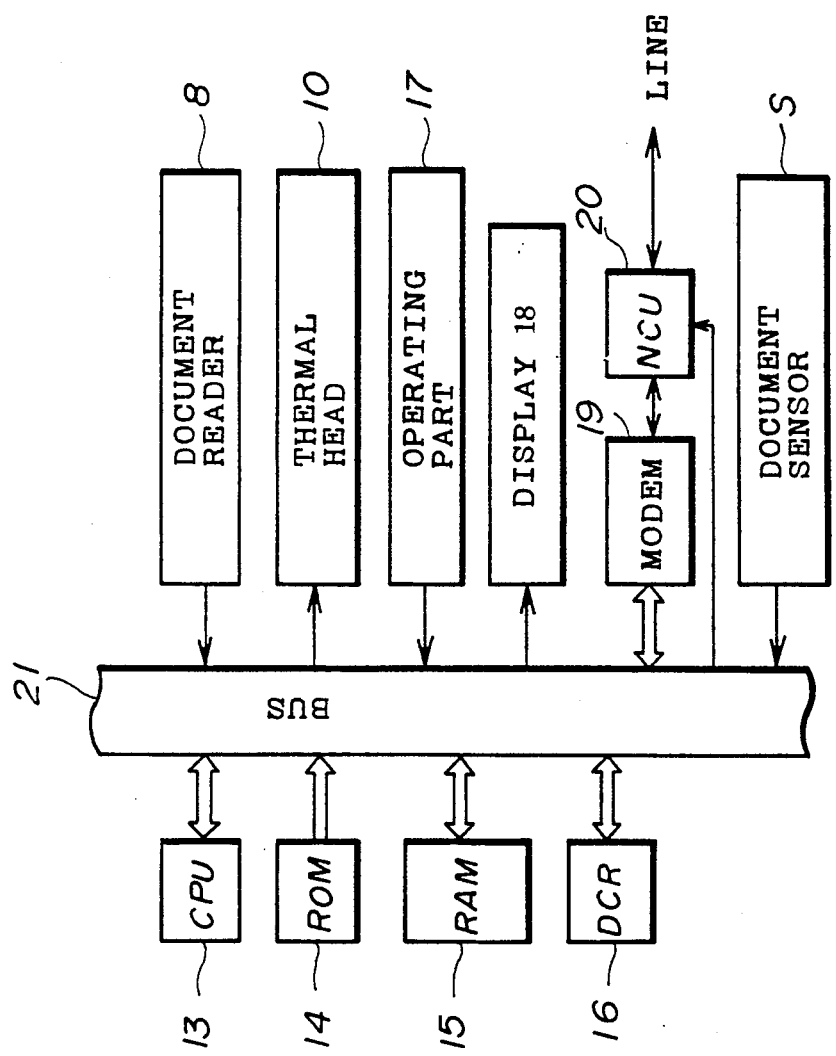
FIG. 1 is a block diagram showing a control system for controlling operation of a facsimile apparatus according to the present invention.

FIG. 1 shows a control system provided for controlling the operation of the facsimile apparatus shown in FIG. 2. In FIG. 1, there are illustrated a central processing unit (CPU) 13, a read only memory (ROM) 14 in which several control programs are stored to control several parts of the facsimile apparatus, a random access memory (RAM) 15 in which image information being supplied by the document reading part 8 from a document is stored, a data compression part (DCR) 16 for compressing the image information read by the document reading part 8 into a compressed data and for decompressing such a compressed data into the original data, an operation panel 17 having several control keys which will be described in more detail below, a display part 18 provided in the operation panel 17 for displaying an operating state of the facsimile apparatus, a modem 19 for performing modulation/demodulation of image information being read by the document reading part 8, a network control unit (NCU) 20 for controlling connection of the facsimile apparatus to a transmission line and disconnection thereof from the transmission line, and a bus 21 for transferring data signals and control signals between the above described components of the facsimile apparatus.

Figure 3:
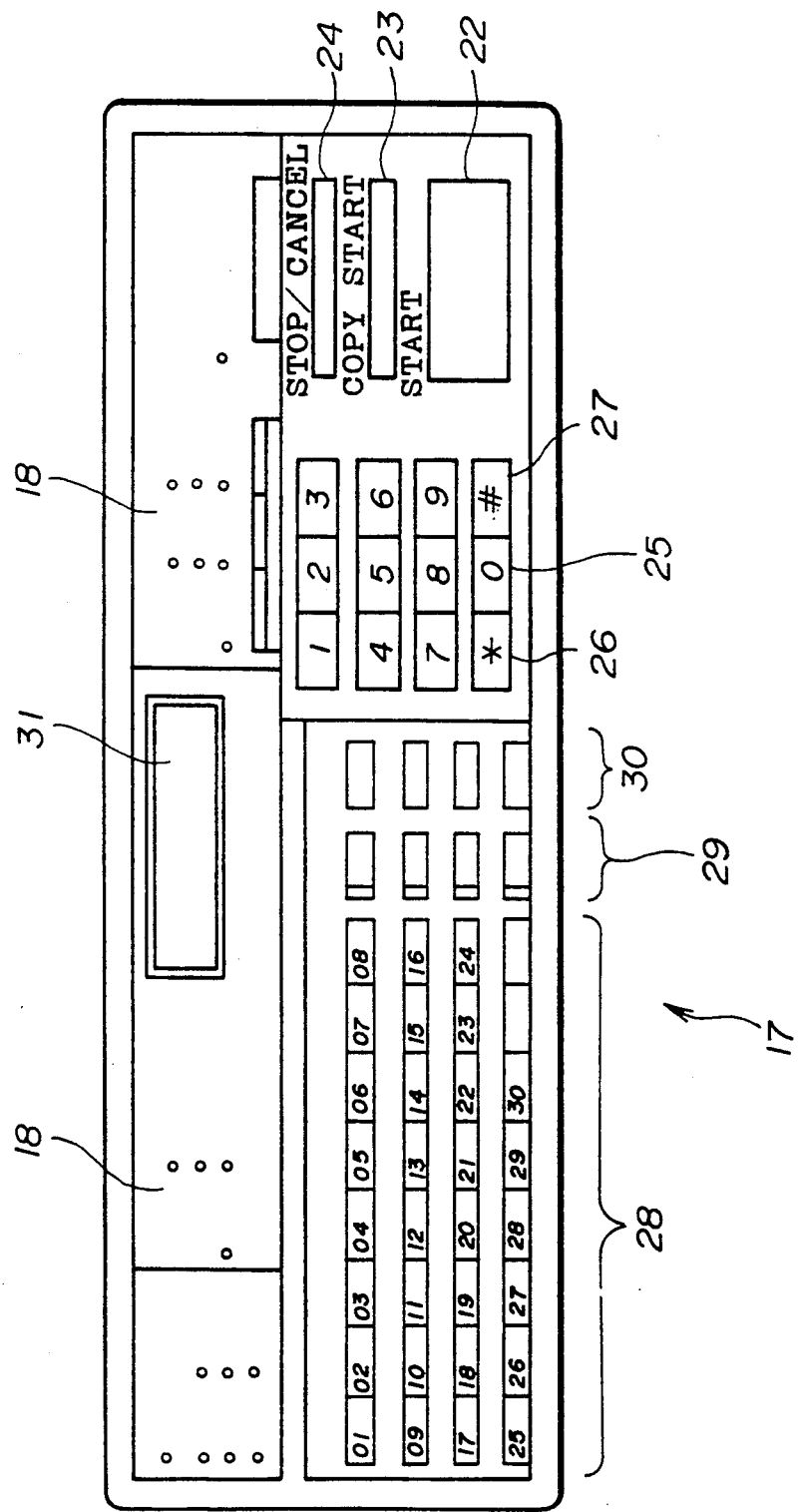
FIG. 3 is a plan view showing an example of an operation panel for controlling the operation of the facsimile apparatus shown in FIG. 2.

FIG. 3 shows an example of the operation panel 17 of the facsimile apparatus. This operation panel 17 as shown in FIG. 3 generally has a number of control keys including a start key 22, a copy start key 23 and a stop/cancel key 24, and a numeric keypad 25 including ten numeric keys "0" through "9", an asterisk ("*") key 26 and a sharp ("#") key 27, these numeric keys being used for inputting a telephone number data. The operation panel 17 includes a number of one-touch function keys 28 arranged in eight columns and four rows, and these function keys 28 are used for storing and calling out of a specific telephone number and may be depressed by one touch action of an operator to store a telephone number in a library memory and call out the same from the library memory. The operation panel 17 further includes a plurality of input/call function keys 29 and a plurality of other function keys 30, the function keys 29 for storing an image data from a document in the RAM 15 and for calling out the same from the RAM 15. In the present embodiment, four input/call function keys 29 are used. The operation panel 17 includes a set of display devices 18 and a segment display part 31. These display devices 18 are formed as a LED (light emitting diode) display and are used for displaying a power ON/OFF state and for displaying a telephone mode and a facsimile mode which are each an operation mode of the facsimile apparatus. In the present embodiment, as illustrated in FIG. 3, the display devices 18 are arranged on both the right and left sides of the segment display part 31.

Figure 4:
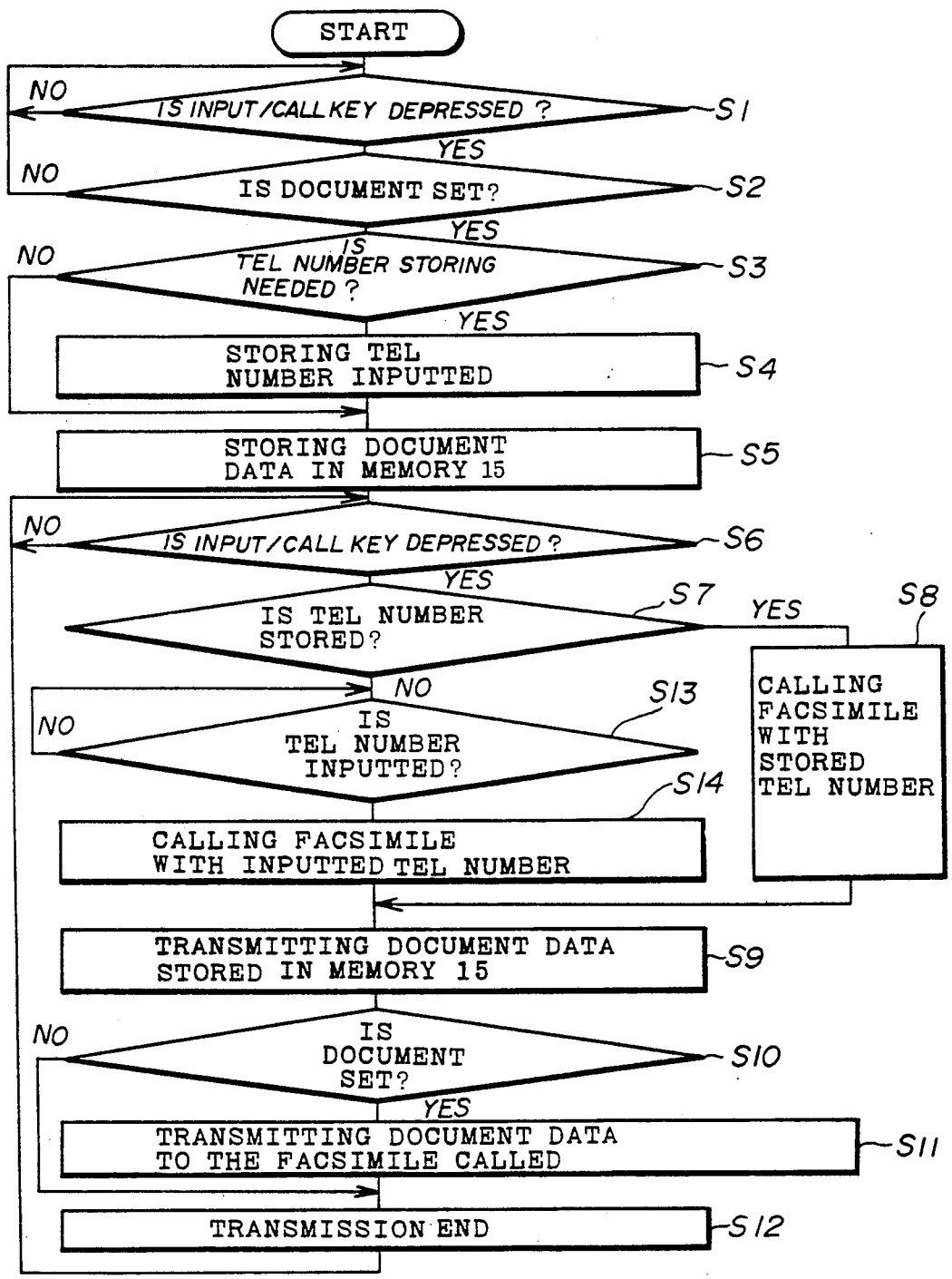
FIG. 4 is a flow chart for explaining an operating procedure of the present invention which is carried out for storing a document data in a library memory and for calling out the same from the library memory.

Next, a description will be given of an operating procedure of the present invention which is carried out for storing and calling out of document information and a telephone number, with reference to FIG. 4. A depression of any key among the input/call function keys 29 is monitored by the central processor 13. In a step S1 of a flow chart shown in FIG. 4, a depression of any of the input/call function keys 29 by an operator is monitored and detected by the central processor 13. In a step S2, a determination is made as to whether a document is set at a prescribed location in the document transport path 1. If a document is set at the prescribed location, then the document detecting sensor S is turned ON. When one of the input/call function keys 29 is depressed and the presence of a document in the document transport path 1 is detected, the operating procedure proceeds to a data storing procedure. In a step S3, a guidance line for asking the operator whether or not a telephone number of a receiving facsimile is stored is displayed in the segment display part 31. If it is necessary to store the telephone number, then, in a step S4, a telephone number data being inputted from the numeric keypad 25 is stored in the RAM 15 as the library memory. In a step S5, document information is read by the document reading part 8 from the document set at the prescribed location of the document transport path 1 and the same is stored in the RAM memory 15, as described above. On the other hand, when it is not necessary to store the telephone number in the step S3 above, then only the document data is stored in the RAM 15 in the step S5 above.

In a waiting condition of the facsimile apparatus, a depression of any of the input/call function keys 29 is monitored and detected by the central processor 13, in a step S6. When a depression of an input/call function key 29 is detected in the step S6, a determination is made whether a telephone number is already assigned to the depressed key 29 and the same is stored in the memory part 15, in a step S7. When the telephone number is one being stored in the memory device 15 and already assigned to the key 29, the telephone number is received from the RAM 15 and a calling of a destination facsimile with the telephone number stored is carried out through the network control unit (NCU) 20 in a step S8. In a step S9, the document data stored is received from the RAM 15 and the same is transmitted to the destination facsimile with the designated telephone number, by means of the modem 19, the NCU 20 and the transmission line. In a step S10, the document detection sensor S detects whether a document is set at a prescribed location of the document transport path 1. If the presence of a document in the document transport path 1 is detected when the document detection sensor S is in the ON state in the step S10, the document data is read by the document reading part 8 from the document as described above, in a step S11. The document data being read by the document reading part 8 is transmitted to the destination facsimile in a step S12.

In the step S7 described above, when no telephone number is assigned to the input/call function key depressed and no telephone number is called out from the RAM 15, the facsimile apparatus is in a waiting condition in which it awaits any telephone number to be inputted from the numeric keypad 25 in a step S13. If a telephone number is inputted in the step S13, then a calling of the destination facsimile with the inputted telephone number is carried out in a step S14. The next procedure to be carried out is the step S9 and subsequent steps S10 through S12 described above. It should be noted that it is also possible to perform printing of the document data stored in the RAM 15 on a recording paper 9 by means of the thermal head 10 by requesting the operator to depress the copy start key 23 on the operation panel 17, in addition to performing the step S13 in which the operator is instructed to input a telephone number of a receiving facsimile.

Figure 5:
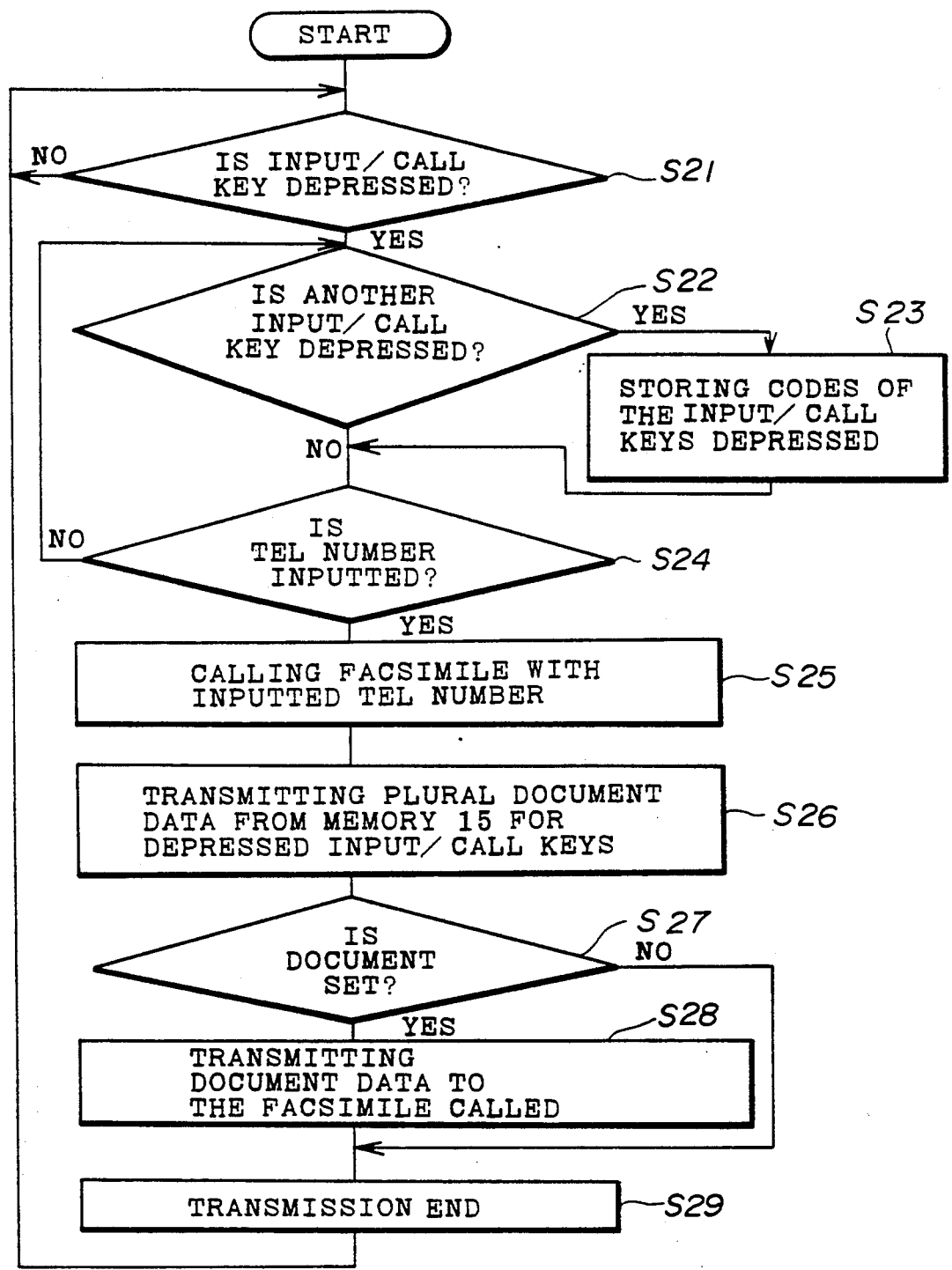
FIG. 5 is a flow chart for explaining another operating procedure which is carried out for storing plural document data in a library memory and for calling out the same from the library memory.

FIG. 5 shows another operating procedure of the present invention which is carried out for transmitting a plurality of document data and telephone numbers already stored in the memory device 15. According to this second embodiment of the present invention, it is possible for the user to store several different document data in the memory part 15 by repeatedly depressing any of the input/call function keys 29 on the operation panel 17. The same procedure as in the steps S1 through S5 above is repeatedly carried out to store data of one document in the RAM 15 when one of the input/call function keys 29 is first depressed. A depression of any key among the plurality of input/call function keys 29 is monitored and detected by the central processor (CPU) 13.

In a step S21 of the flow chart shown in FIG. 5, a determination is made whether any of the input/call function keys 29 is again depressed, and this depression of the key 29 is detected by the central processor 13, as described above. In a step S22, a determination is made whether another input/call function key 29 is depressed. When two or more successive depressions of several input/call function keys 29 are detected in the steps S21 and 22, codes corresponding to the depressed input/call function keys 29 are stored in a buffer memory part of the central processor 13 in a step S23. In a step S24, the facsimile apparatus is in a waiting condition in which the central processor 13 awaits a telephone number to be inputted from the numeric keypad 25. If a telephone number is actually inputted from the numeric keypad 25 in the step S24, then, in a step S25, a calling of the receiving facsimile designated by the telephone number inputted is made by the facsimile apparatus. In a step S26, several different document data already stored in the RAM 15 corresponding to the input/call function keys 29 depressed in the steps S21, S22 are called out from the RAM 15 and transmitted to the designated receiving facsimile via the modem 19 and the transmission line. After this, in a step S27, a determination is made whether a document set at a given location of the facsimile apparatus has been detected by the document detection sensor S, which is turned ON. If the document detection sensor S is turned ON, then a document data is read by the document reading part 8 from the document and the document data read from the document is transmitted to the designated receiving facsimile through the transmission line in a step S28. Finally, in a step S29, the transmission of the data read from the document is completed.

By making use of the plurality of one-touch function keys 28 on the operation panel 17 instead of the input/call function keys 29 described above, as shown in FIG. 3, to store and call out several document data in the memory device, it is possible for the present invention to store a greater number of document data in the memory 15 and transmit the same to a destination facsimile through a transmission line. Many possible combinations of document data stored in the memory 15 can be transmitted to a destination facsimile through a transmission line, enabling a wide application of the facsimile apparatus. Also, with the use of the plurality of one-touch function keys 28 to store and call out several document data, it is possible to make the provision of special function keys on the operation panel unnecessary, thereby ensuring a simple construction of the operation panel 17.

According to the facsimile apparatus of the present invention, a document data read by the document reading part can include many document data assigned to the function keys 28 as well as an increased number of transmission data being combined together, and a facsimile apparatus having a wide application is achieved. In such a case, it is unnecessary to provide the special function on the operation panel of the facsimile apparatus, and it is possible to make the configuration of the operation panel simple.

Further, the present invention is not limited to the above described embodiments, and variations and modifications may be made without departing from the scope of the present invention.

What is claimed is:

1. A facsimile apparatus comprising:
    document reading means for reading a document to generate an image data from said document;
    memory means for storing said image data from said document;
    calling control means for enabling the image data from the document to be stored in said memory means and for calling out said image data from said memory means;
    input means for inputting a telephone number to designate a receiving facsimile by the telephone number inputted;
    transmitting means for transmitting an image data stored in said memory means to a receiving facsimile through a transmission line,
    said transmitting means transmitting an image data stored in said memory means to a receiving facsimile through a transmission line after said image data is called out by said calling control means from said memory means and said receiving facsimile is designated by a telephone number inputted by said input means; and
    a document detection sensor for detecting a document set at a given location of a document transport path, said document reading means reading said document to generate an image data from said document after said document is detected by said document detection sensor.

2. The apparatus as claimed in claim 1, wherein said calling control means includes a specified key, a depression of the specified key allowing an image data of a document to be stored in the memory means after the document set at a given position of a document transport path is detected, said calling control means calling out the image data from the memory means when the specified key is again depressed after the storing of the image data in the memory means by said calling control means.

3. The apparatus as claimed in claim 1, wherein said calling control means includes a specified key, said specified key being formed as a one touch function key on an operation panel of the facsimile apparatus, and said one touch function key being operative to store a telephone number of a receiving facsimile in the memory means and to call out the same from the memory means.

4. A facsimile apparatus comprising:

document reading means for reading a document to generate an image data from said document;

memory means for storing said image data from said document as well as a telephone number of a receiving facsimile;

calling control means for enabling said image data and said telephone number to be stored in said memory means and for calling out said image data as well as said telephone number from said memory means;

transmitting means for transmitting an image data stored in said memory means to a receiving facsimile through a transmission line, said transmitting means transmitting an image data to a receiving facsimile through a transmission line after said image data as well as said telephone number are called out by said calling control means from said memory means, said receiving facsimile being designated by said telephone number called out from said memory means; and a document detection sensor for detecting a document set at a given position of a document transport path, said document reading means reading said document to generate an image data from said document after said document is detected by said document detection sensor.

5. The apparatus as claimed in claim 4, wherein said calling control means includes a specified key, a depression of the specified key allowing an image data of a document as well as a telephone number of a receiving facsimile to be stored in the memory means after the document set at a given position of a document transport path is detected, said calling control means calling out the image data from the memory means when the specified key is again depressed after the storing of the image data in the memory means by said calling control means.

6. The apparatus as claimed in claim 4, wherein said calling control means includes a specified key, said specified key being formed as a one touch function key on an operation panel of the facsimile apparatus, and said one touch function key being operative to store a telephone number of a receiving facsimile in the memory means and to call out the same from the memory means.

7. A facsimile apparatus comprising:

document reading means for reading a document to generate an image data from said document;

memory means for storing a plurality of image data which are each read by said document reading means;

a plurality of calling control means for enabling a plurality of image data to be stored in said memory means and for selectively calling out any of said plurality of the stored image data from said memory means;

input means for inputting a telephone number to designate a receiving facsimile by the telephone number inputted; and transmitting means for transmitting a plurality of image data stored in said memory means to a receiving facsimile through a transmission line, said transmitting means transmitting a plurality of image data stored in said memory means to a receiving facsimile through a transmission line after said plurality of image data are called out by said plurality of calling control means from said memory means and said receiving facsimile is designated by a telephone number inputted by said input means.

8. The apparatus as claimed in claim 7, wherein said calling control means includes a plurality of specified keys, a depression of one of the specified keys allowing an image data of a document to be stored in the memory means after the document set at a given position of a document transport path is detected, said calling control means calling out the image data from the memory means when the same specified key is again depressed after the storing of the image data in the memory means by said calling control means.

9. The apparatus as claimed in claim 7, further comprising a document detection sensor for detecting a document set at a given location of a document transport path, said document reading means reading said document to generate an image data from said document after said document is detected by said document detection sensor.

10. The apparatus as claimed in claim 7, wherein said calling control means include a plurality of one touch function keys on an operation panel of the facsimile apparatus, said one touch function keys each being operative to store a telephone number of a receiving facsimile in the memory means and to call out the same from the memory means.

* * * * *